United States Patent
Ganapathy et al.

(10) Patent No.: US 12,016,072 B2
(45) Date of Patent: Jun. 18, 2024

(54) OPTIMIZING ACCESS POINT DEVICE ONBOARDING COMPLETION TIME USING MOBILE APP

(71) Applicant: ARRIS Enterprises LLC, Suwanee, GA (US)

(72) Inventors: Jalagandeswari Ganapathy, Bangalore (IN); Muralidharan Narayanan, Bangalore (IN)

(73) Assignee: ASRRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/346,467

(22) Filed: Jun. 14, 2021

(65) Prior Publication Data

US 2022/0030658 A1    Jan. 27, 2022

Related U.S. Application Data

(60) Provisional application No. 63/054,342, filed on Jul. 21, 2020.

(51) Int. Cl.
*H04W 76/20* (2018.01)
*H04W 8/00* (2009.01)

(52) U.S. Cl.
CPC .......... *H04W 76/20* (2018.02); *H04W 8/00* (2013.01)

(58) Field of Classification Search
CPC ..... H04W 84/12; H04W 76/20; H04W 88/18; H04W 24/02; H04W 8/00; H04L 41/0253; H04L 41/14; H04L 41/12; G06F 8/65
See application file for complete search history.

(56) References Cited

U.S. PATENT DOCUMENTS

2010/0157543 A1  6/2010  Shohet et al.
2010/0157989 A1  6/2010  Krzyzanowski et al.
(Continued)

FOREIGN PATENT DOCUMENTS

JP   2011113391 A  *  6/2011  ............... G06F 8/61
KR  10-2011-009596     8/2011
(Continued)

OTHER PUBLICATIONS

International Search Report issued Oct. 6, 2021 in International (PCT) Application No. PCT/US2021/037186.
(Continued)

*Primary Examiner* — The Hy Nguyen
(74) *Attorney, Agent, or Firm* — Wenderoth, Lind & Ponack, L.L.P.

(57) ABSTRACT

A client device for use with an access point device, a gateway device, and an external server having stored therein firmware version information indicating a most recent firmware version number, n, associated with the access point device. The access point device having a loaded firmware version number, m, loaded thereon. The client device includes a memory and a processor, which may cause the client device to: connect to the access point device; obtain, from the access point device, the loaded firmware version number, m; obtain, from the external server, the most recent firmware version number, n; disconnect from the access point device; and wait a predetermined period of time and then connect to the gateway device, wherein the predetermined period of time is a first period of time when m=n, and wherein the predetermined period of time is a second period of time when m<n.

12 Claims, 5 Drawing Sheets

(56) References Cited

U.S. PATENT DOCUMENTS

| | | | |
|---|---|---|---|
| 2010/0157990 A1 | 6/2010 | Krzyzanowski et al. | |
| 2010/0159898 A1 | 6/2010 | Krzyzanowski et al. | |
| 2016/0373306 A1* | 12/2016 | Saha .................. | H04L 41/06 |
| 2017/0054571 A1 | 2/2017 | Kitchen et al. | |
| 2018/0129511 A1 | 5/2018 | Krzyzanowski et al. | |
| 2020/0026505 A1* | 1/2020 | Olderdissen ........ | G06F 9/44526 |
| 2021/0044579 A1* | 2/2021 | Nelson-Gal ......... | H04L 41/0859 |

FOREIGN PATENT DOCUMENTS

| | | | | |
|---|---|---|---|---|
| WO | WO-2013078792 A1 * | 6/2013 | ............. | H04W 8/22 |
| WO | 2020/132448 | 6/2020 | | |

OTHER PUBLICATIONS

International Preliminary Report on Patentability dated Jan. 24, 2023 in International (PCT) Application No. PCT/US2021/037186.

\* cited by examiner

OPTIMIZING ACCESS POINT DEVICE ONBOARDING COMPLETION TIME USING MOBILE APP

BACKGROUND

Embodiments of the invention relate to onboarding an access point device onto a gateway.

SUMMARY

Aspects of the present invention are drawn to a client device for use with an access point device, a gateway device, an external network, and an external server. The gateway device is configured to provide a wireless local area network. The access point device is configured to onboard onto the gateway device. The external server has, stored therein, firmware version information indicating a most recent firmware version number, n, associated with the access point device. The access point device has a loaded firmware version number, m, loaded thereon. The client device includes a memory and a processor configured to execute instructions stored on the memory to cause the client device to: connect to the access point device; obtain, from the access point device, the loaded firmware version number, m; obtain, from the external server via the external network, the most recent firmware version number, n; disconnect from the access point device; and wait a predetermined period of time and then connect to the gateway device, wherein the predetermined period of time is a first period of time when m=n, and wherein the predetermined period of time is a second period of time when m<n.

In some embodiments, the processor is further configured to cause the client device to obtain the most recent firmware version number, n, from a uniform resource locator (URL) of the Internet. In some of these embodiments, the URL of the Internet is obtained from the access point device.

In some embodiments, the second predetermined period is longer than the first predetermined period.

Other aspects of the present disclosure are drawn to a method of operating a client device for use with an access point device, a gateway device, an external network, and an external server. The gateway device is configured to provide a wireless local area network. The access point device is configured to onboard onto the gateway device. The access point device has unique access point device information stored thereon and the external server having stored therein firmware version information indicating a most recent firmware version number, n, associated with the access point device. The access point device has a loaded firmware version number, m, loaded thereon. The method includes: connecting, via a processor configured to execute instructions stored on a memory and from the access point device, to the access point device; obtaining, via the processor, the loaded firmware version number, m; obtaining, via the processor and from the external server via the external network, the most recent firmware version number, n; disconnecting, via the processor, from the access point device; and waiting, via the processor, a predetermined period of time and then connecting to the gateway device, wherein the predetermined period of time is a first predetermined period of time when m=n, and wherein the predetermined period of time is a second predetermined period of time when m<n.

In some embodiments, the method includes obtaining, via the processor, the most recent firmware version number, n, from a URL of the Internet. In some of these embodiments, the method includes obtaining the URL of the Internet from the access point device.

In some embodiments, the second predetermined period is longer than the first predetermined period.

Other aspects of the present disclosure are drawn to a non-transitory, computer-readable media having computer-readable instructions stored thereon, the computer-readable instructions being capable of being read by a client device for use with an access point device, a gateway device, an external network, and an external server. The gateway device is configured to provide a wireless local area network, and the access point device is configured to onboard onto the gateway device. The access point device has unique access point device information stored thereon. The external server has stored therein firmware version information indicating a most recent firmware version number, n, associated with the access point device, and the access point device has a loaded firmware version number, m, loaded thereon. The computer-readable instructions are capable of instructing the client device to perform the method including: connecting, via a processor configured to execute instructions stored on a memory and from the access point device, to the access point device; obtaining, via the processor, the loaded firmware version number, m; obtaining, via the processor and from the external server via the external network, the most recent firmware version number, n; disconnecting, via the processor, from the access point device; and waiting, via the processor, a predetermined period of time and then connect to the gateway device, wherein the predetermined period of time is a first predetermined period of time when m=n, and wherein the predetermined period of time is a second predetermined period of time when m<n.

In some embodiments, the method includes obtaining, via the processor, the most recent firmware version number, n, from a URL of the Internet. In some of these embodiments, the method includes obtaining the URL of the Internet from the access point device.

In some embodiments, the second predetermined period is longer than the first predetermined period.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

A conventional system and method for onboarding an APD to a gateway device will now be described with reference to FIGS. 1-2.

Figure 1:
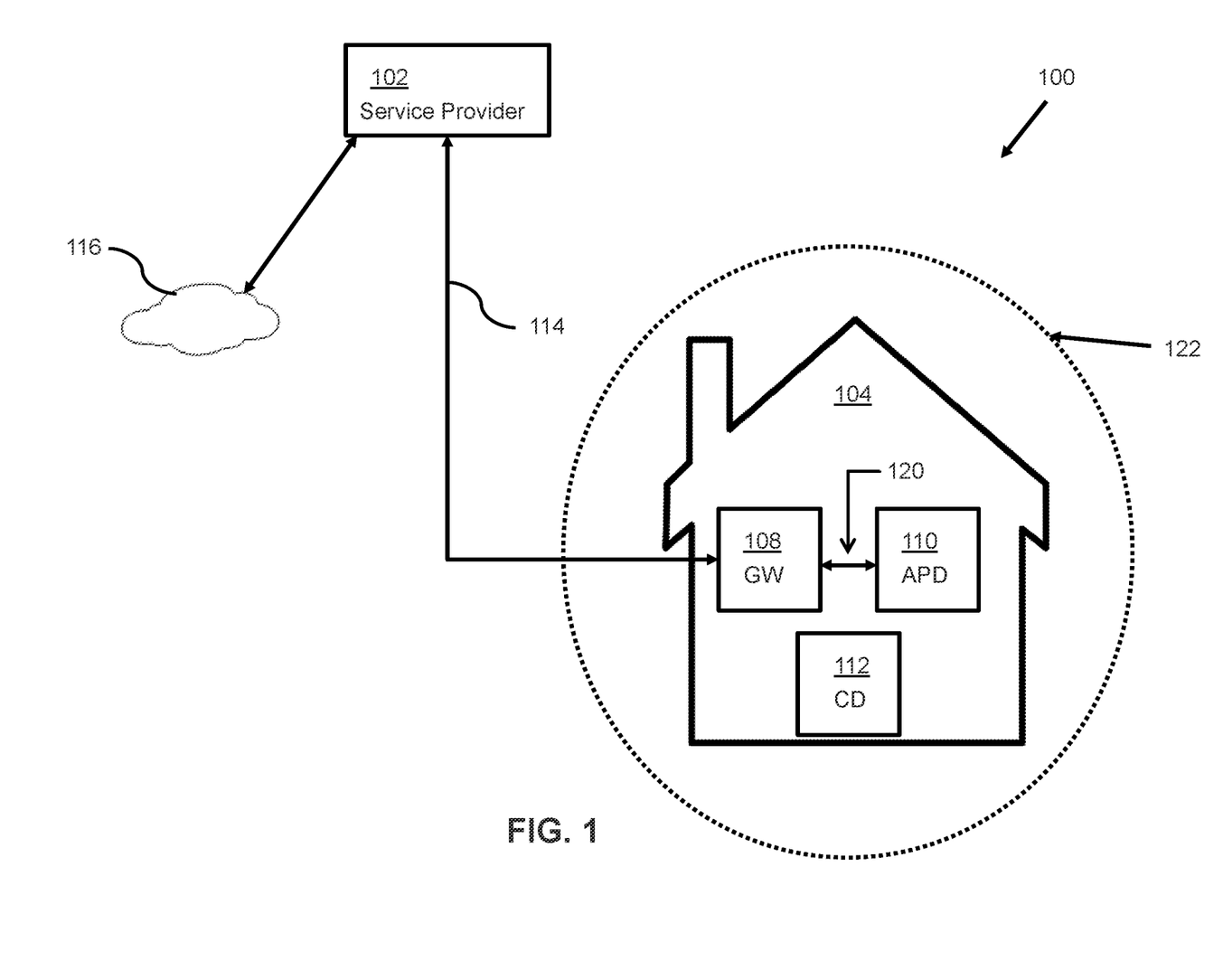
FIG. 1 illustrates structural components implementing a communication network.

FIG. 1 illustrates structural components implementing a communication network 100.

As shown in the figure, communication network 100 includes a service provider 102, a residence 104, a gateway device 108, a APD 110, a client device 112, physical media/wiring 114, an external network 116, e.g., the Internet, a backhaul 120, and a wireless local area network (WLAN) 122.

A gateway device, such as gateway device 108, functions as a gateway, and additionally as a router. A router is a networking device used to perform traffic directing functions on the internet. Gateway device 108, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 108 may be any device or system that is operable to allow data to flow from one discrete network to another, which in this example is from WLAN 122 in FIG. 1 to external network 116, e.g., the Internet. Gateway device 108 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 108 establishes, or is part of, WLAN 122, using Wi-Fi for example, such that client device 112 and APD 110 are able to communicate wirelessly with gateway device 108. In particular, gateway device 108 is able to communicate wirelessly directly with client device 112 and APD 110. The term Wi-Fi as used herein may be considered to refer to any of Wi-Fi 4, 5, 6, 6E, or any variation thereof.

Further, it should be noted that gateway device 108 is able to communicate with service provider 102 via physical media/wiring 114, which may optionally be a wireless communication system, such as 4G, or 5G, and further is able to connect to external network 116, e.g., the Internet, via service provider 102.

Consider the situation where a user (not shown) using client device 112 has just purchased APD 110 for residence 104, and would like to connect APD 110 to gateway device 108. The conventional method for onboarding APD 110 to gateway device 108 using client device 112 will now be described with reference to FIG. 2.

Figure 2:
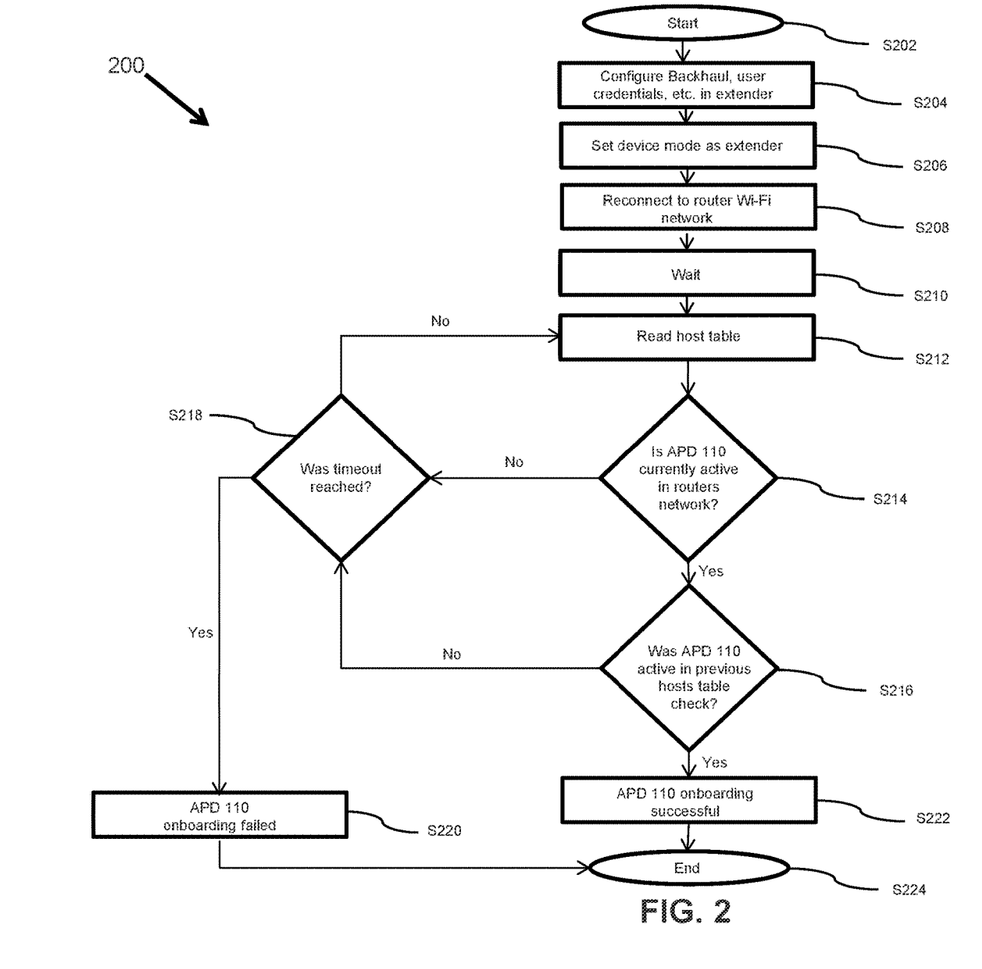
FIG. 2 illustrates an algorithm to be executed by a processor to onboard an access point device (APD) onto a gateway device.

FIG. 2 illustrates an algorithm 200 to be executed by a processor to onboard APD 110 onto gateway device 108.

As shown in the figure, algorithm 200 starts (S202), and a backhaul is configured (S204). For example, returning to FIG. 1, assume a user (not shown) purchases APD 110 for residence 104. To activate APD 110, it must be onboarded to gateway device 108 by way of backhaul 120. When APD 110 is turned on, it will detect a signal from gateway device 108 and will initiate an onboarding sequence, in which backhaul 120 is established. Backhaul 120 is a dedicated communication channel between APD 110 and gateway device 108, and backhaul 120 may be a wired or wireless communication channel. Client device 112 may provide user credentials associated with client device 112, non-limiting examples of which include a user ID, a password, and SSID. Gateway device 108 provides these credentials by way of backhaul 120 to APD 110.

Returning to FIG. 2, after a backhaul is configured (S204), the device mode is set as extender (S206). For example, as shown in FIG. 1, once backhaul 120 is established, client device 112 will instruct gateway device 108 to set APD 110 as a Wi-Fi extender. A Wi-Fi extender is a device used to expand the coverage of a router. For example, APD 110 takes the signal broadcasted by gateway device 108 and rebroadcasts it to areas where coverage is weak.

Returning to FIG. 2, after the device mode is set as extender (S206), the gateway device is reconnected to the Wi-Fi network (S208). For example, as shown in FIG. 1, once APD 110 is officially set as a Wi-Fi extender, gateway device 108 will connect APD 110 to external network 116 by way of service provider 102.

Returning to FIG. 2, after the gateway device is reconnected to the Wi-Fi network (S208), the client device waits (S210). For example, as shown in FIG. 1, once APD 110 officially is connected to external network 116, client device 112 will wait a predetermined period of time. For example, after gateway device 108 has connected APD 110 to external network 116 or service provider 102, APD 110 may need to obtain the most current version of its software from service provider 102. It will take time for APD 110 to access service provider 102, and download the most current version of its firmware. After the download is complete, APD 110 will update its firmware, which will lead to the rebooting of APD 110. While APD 110 is rebooting, it disassociates from gateway device 108. When APD 110 completes the reboot process, it will associate with gateway device 108 once again, reestablishing backhaul 120.

Returning to FIG. 2, after the client device waits (S210), the client device reads the host table on gateway device (S212). A host table is a simple text file that associates IP addresses with hostnames. For example, gateway device 108 will list, on its host table, all APDs that are associated with gateway device 108. In this example, once APD 110 has completed onboarding onto gateway device 108, APD 110 will be listed on the host table. Client device 112 therefore reads the host table of gateway device 108 to determine whether APD 110 has completed the onboarding process. APD 110 will restart soon after it has received the most recent software update. Client device 112 searches the host table for APD 110 after APD 110 has finished updating.

Returning to FIG. 2, after the client device reads the host table of the gateway device (S212), it is determined whether or not the APD is currently active in the network of the gateway device (S214). For example, if APD 110 is listed on the host table of gateway device 108, then it will be determined the APD 110 is active in the network of gateway device 108. Alternatively, if APD 110 is not listed on the host table of gateway device 108, then it is determined that APD 110 is not active in the network of gateway device 108.

Returning to FIG. 2, if it is determined that ADP 110 is not currently active in the network of the gateway device (No at S214), then it will be determined by the client device if the timeout was reached (S218). For example, as shown in FIG. 1, client device 112 may have a predetermined timer that is started after an initial reading of the host table (S212). If client device 112 determines that the wait period has timed out (Yes at S218), then the onboarding of ADP 110 has failed (S220). This ends algorithm 200 (S224).

Returning to FIG. 2, if the client device determines that the wait period has not timed out (No at S218), then the client device once again reads the host table on the gateway device (return to S212). For example, if the predetermined wait period has not expired, client device 112 will continue to search the host table of gateway device 108.

Returning to FIG. 2, if it is determined that the APD is currently active in the network of the gateway device (Yes at S214), the client device determines if the APD was active in a previous reading of the host table (S216). For example, as shown in FIG. 1, if client device 112 has successfully found APD 110 in the host table, it will determine if APD 110 was found in previous host table checks.

Returning to FIG. 2, if it is determined that the APD was not active in previous host table check (No at S216), then again it is determined if a timeout was reached (return to S218).

However, if it is determined that the ADP was active in previous host table checks (Yes at S216), then the onboarding of the ADP was a success (S222). For example, returning to FIG. 1, if client device was able to find APD 110 in multiple host table checks before the predetermined period of time has ended, then APD 110 was successfully onboarded to gateway device 108, hereby ending algorithm 200 (S224).

What is needed is a system and method for optimizing the time taken to onboard an APD using a client device.

A system and method in accordance with the present disclosure optimizes the time taken to onboard an APD using a client device.

In accordance with the present disclosure, a client device determines the current firmware version of an APD. The client device also determines the firmware upgrade URL address of the APD. The client device receives the contents of the URL and distributes it to the APD. The client device then will compare the current APD firmware version to the firmware upgrade contents taken from the URL to determine the upgrade status. This in turn will eliminate the fixed wait time if the APD already is programmed with the updated firmware.

An example system and method for optimizing APD onboarding completion time using a client device in accordance with aspects of the present disclosure will now be described in greater detail with reference to FIGS. 3-5.

Figure 3:
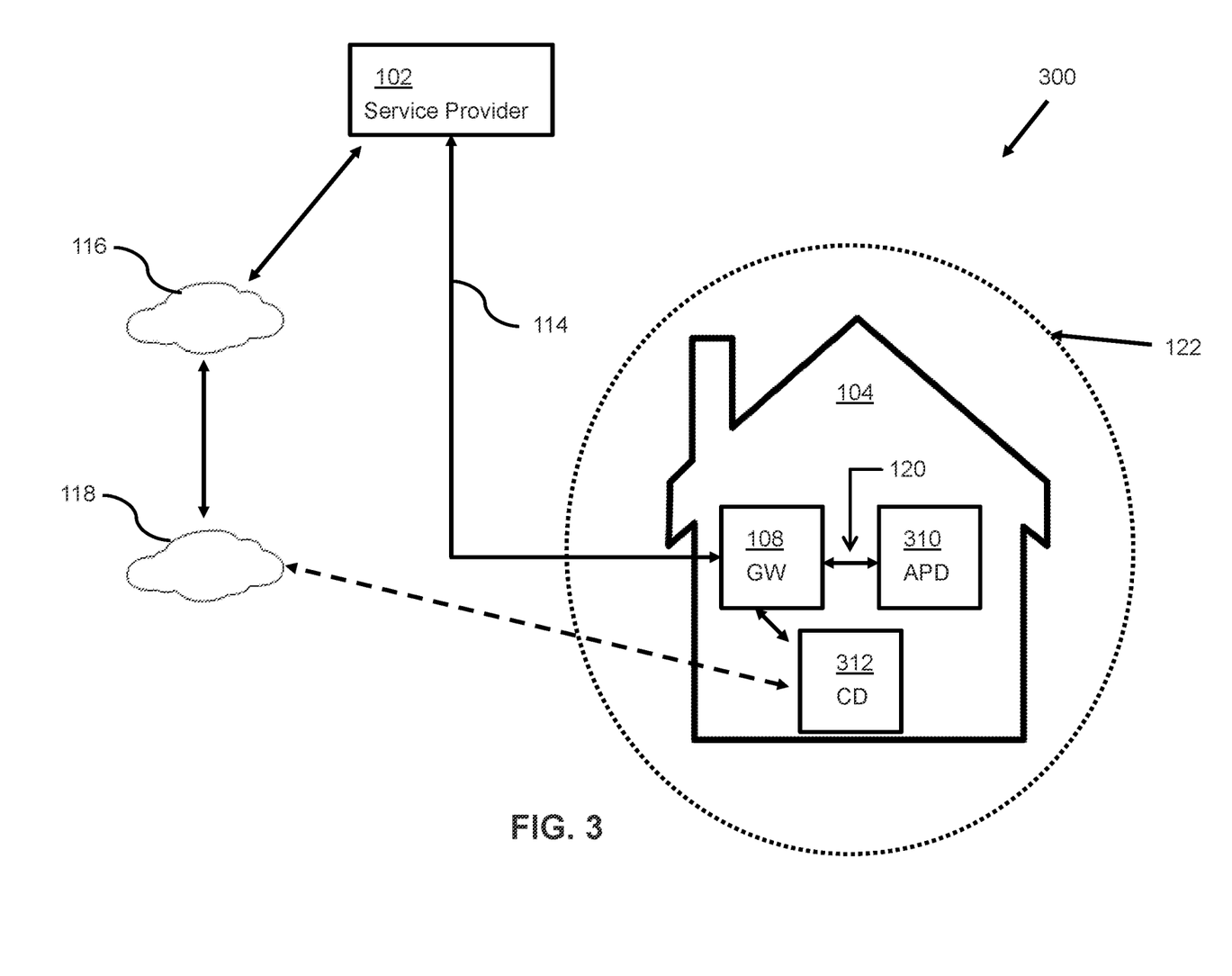
FIG. 3 illustrates structural components implementing a communication network in accordance with aspects of the present disclosure.

FIG. 3 illustrates structural components implementing a communication network 300 in accordance with aspects of the present disclosure.

As shown in FIG. 3, communication network 300 includes a service provider 102, a residence 104, a gateway device 108, an APD 310, a client device 312, physical media/wiring 114, an external network 116, e.g., the Internet, a WLAN 122, and a cellular network 118.

Service provider 102 is arranged to communicate with gateway device 108 via physical media/wiring 114. Gateway device 108 is arranged to communicate with APD 310, as well as client device 312. Client device 312 is also able to communicate with cellular network 118. External network 116 is arranged to communicate with service provider 102 as well as cellular network 118.

Consider the situation where a user (not shown) using client device 312 has just purchased APD 310 for residence 104, and would like to connect APD 310 to gateway device 108. The method for optimizing the onboarding of APD 310 to gateway device 108 using client device 112 will now be described with reference to FIG. 4.

Figure 4:
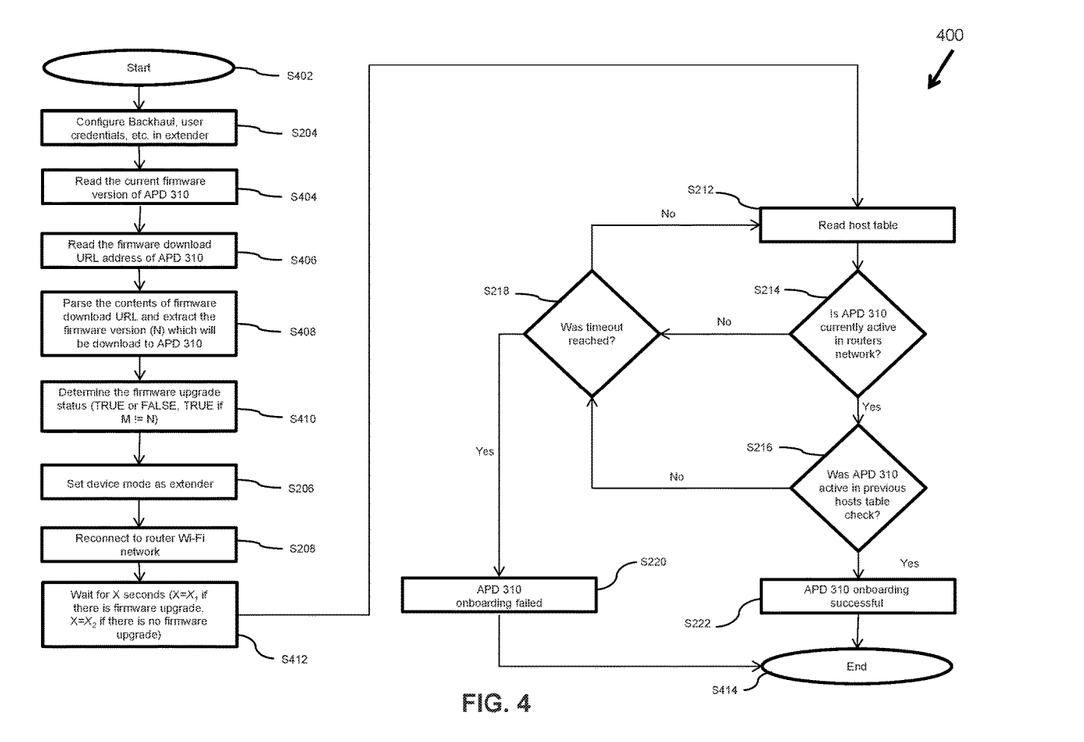
FIG. 4 illustrates an algorithm to be executed by a processor to onboard an APD onto the gateway device in accordance with aspects of the present disclosure.

FIG. 4 illustrates an algorithm 400 to be executed by a processor to onboard APD 310 onto gateway device 108 in accordance with aspects of the present disclosure.

As shown in the figure, algorithm 400 starts (S402), and a backhaul is configured (S204). This is performed in the same manner as discussed above in reference to FIG. 2.

Returning to FIG. 4, after the backhaul is configured (S204), the current firmware version number of the APD is read (S404). For example, returning to FIG. 3, once backhaul 120 is established between gateway device 108 and APD 310, client device 312 will find the current firmware version number, m, of APD 310. This will be discussed with greater detail with reference to FIG. 5.

Figure 5:
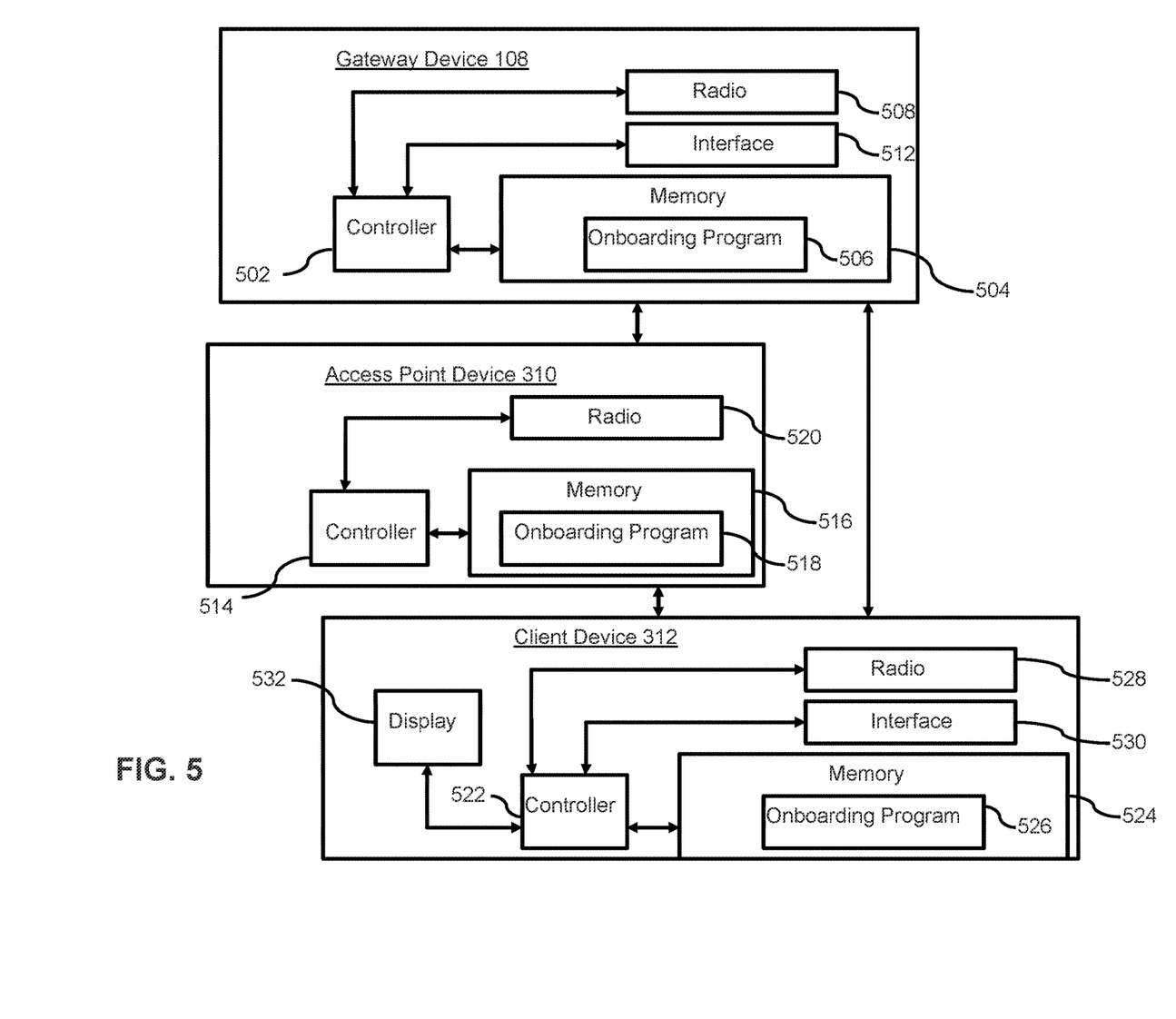
FIG. 5 illustrates an exploded view of the gateway device, the APD, and a client device.

FIG. 5 illustrates an exploded view of gateway device 108, APD 310, and client device 312 in accordance with aspects of the present disclosure.

As shown in FIG. 5, gateway device 108 includes: a controller 502; a memory 504, which has stored therein an onboarding program 506; at least one radio, a sample of which is illustrated as a radio 508; and an interface circuit 512.

In this example, controller 502, memory 504, radio 508, and interface circuit 512 are illustrated as individual devices. However, in some embodiments, at least two of controller 502, memory 504, radio 508, and interface circuit 512 may be combined as a unitary device. Whether as individual devices or as combined devices, controller 502, memory 504, radio 508, and interface circuit 512 may be implemented as any combination of an apparatus, a system and an integrated circuit. Further, in some embodiments, at least one of controller 502, memory 504 and interface circuit 512 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 502 may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 108 in accordance with the embodiments described in the present disclosure. Interface circuit 512 can include one or more connectors, such as RF connectors, or Ethernet connectors, and/or wireless communication circuitry, such as 5G circuitry and one or more antennas.

Memory 504 can store various programming, and user content, and data.

Radio 508 (and preferably two or more radios) may also be referred to as a wireless communication circuit, such as a Wi-Fi WLAN interface radio transceiver and is operable to communicate with client device 312 and with APD 310. Radio 508 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Gateway device 108 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Interface circuit 512 can include one or more connectors, such as RF connectors, or Ethernet connectors, and/or wireless communication circuitry, such as 5G circuitry and one or more antennas. Interface 512 receives content from service provider 102 (as shown in FIG. 3) by known methods, non-limiting examples of which include terrestrial antenna, satellite dish, wired cable, DSL, optical fibers, or 5G as discussed above. Through interface circuit 512, gateway device 108 receives an input signal, including data and/or audio/video content, from service provider 102 and can send data to service provider 102.

As shown in FIG. 5, APD 310 includes: a controller 514; a main memory 516, which has stored therein an onboarding program 518; and at least one radio, a sample of which is illustrated as a radio 520.

In this example, controller 514, main memory 516 and radio 520 are illustrated as individual devices. However, in some embodiments, at least two of controller 514, main memory 516 and radio 520 may be combined as a unitary device. Further, in some embodiments, at least one of controller 514 and main memory 516 may be implemented as a computer having tangible computer-readable media for carrying or having computer-executable instructions or data structures stored thereon.

Controller 514 can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the APD 310 in accordance with the embodiments described in the present disclosure. Memory 516 can store various programming, and user content, and data. Radio 520, such as a Wi-Fi WLAN interface radio transceiver, is operable to communicate with client device 312 and with gateway device 108, as shown in FIG. 5. Radio 520 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. APD 310 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Memory 516 can store various programming, and user content, and data.

Radio 520 (and preferably two or more radios) may also be referred to as a wireless communication circuit, such as a Wi-Fi WLAN interface radio transceiver and is operable to communicate with client device 312 and with gateway device 108. Radio 520 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. APD 310 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

As shown in FIG. 5, client device 312 includes: a controller 522; a main memory 524, which has stored therein an onboarding program 526; and at least one radio, a sample of which is illustrated as a radio 528; an interface 530 and a display 532.

In this example, controller 522, main memory 524, radio 528, interface 530 and display 532 are illustrated as individual devices. However, in some embodiments, at least two of controller 522, main memory 524, radio 528, interface 530 and display 532 may be combined as a unitary device. Further, in some embodiments, at least one of controller 522 and main memory 524 may be implemented as a computer having tangible computer-readable media for carrying or having computer-executable instructions or data structures stored thereon.

Controller 522, which can include a dedicated control circuit, CPU, microprocessor, etc., controls the circuits of client device 312.

Memory 524, as will be described in greater detail below, includes onboarding program 526 which has instructions therein to enable client device 312 to: connect to APD 310; obtain, from APD 310, the loaded firmware version number, m; obtain, from an external server in service provider 102 via the external network, the most recent firmware version number, n; disconnect from APD 310; and wait a predetermined period of time and then connect to gateway device 108, wherein the predetermined period of time is a first period of time when m=n, and wherein the predetermined period of time is a second period of time when m<n.

Memory 524, in some embodiments as will be described in greater detail below, includes onboarding program 526 which has additional instructions thereon to enable client device 312 to obtain the most recent firmware version number, n, from a URL of the Internet. In some embodiments, the URL is obtained from APD 310.

In some embodiments, the second predetermined period is longer than the first predetermined period.

Radio 528, may include a Wi-Fi WLAN interface radio transceiver that is operable to communicate with APD 310 and with gateway device 108, as shown in FIG. 3 and also may include a cellular transceiver operable to communicate with cellular network 118. Radio 528 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 312 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Interface 530 can include one or more connectors, such as RF connectors, or Ethernet connectors, and/or wireless communication circuitry, such as 5G circuitry and one or more antennas. Interface 530 receives content from service provider 102 (as shown in FIG. 3) by known methods, non-limiting examples of which include terrestrial antenna, satellite dish, wired cable, DSL, optical fibers, or 5G as discussed above. Through interface circuit 530, client device 312 receives an input signal, including data and/or audio/video content, from service provider 102 and can send data to service provider 102.

Display 532 is operable to display images associated with the connection status of gateway device 108 and APD 310.

With respect to reading the current firmware version number of an APD, client device 312 may obtain the current firmware version number, m, of APD 310. In an example embodiment, controller 522 instructs radio 528 to request APD 310 to provide the most current firmware version number, m, of APD 310. Radio 530 of APD 310 receives the request which is provided to controller 514. Controller 514 obtains the most current firmware version number, m, as indicated in onboarding program 518 of APD 310. This most current firmware version number, m, corresponds to the most current firmware version that would likely have been installed at the factory before distribution of APD 310 to a store, from where the user had purchased APD 310.

In some cases, the time from which APD 310 had been shipped from the factory, to when the user had actually purchased APD 310, may be on the order of months. Therefore, there is a likelihood that the firmware version for operating APD 310 may have been updated to a more current version. Whether or not APD 310 has the most current version of the firmware loaded within onboarding program 518 is an issue that is addressed with the present disclosure.

Returning to FIG. 4, after the current firmware version number of the APD is read (S404), the firmware download URL address of the APD is read (S406). For example, after client device 312 receives the current firmware version of APD 310, it will similarly read a firmware download URL address of a location of the most current available firmware version of APD 310. It should be noted that in some examples, the firmware download URL address may be read (S406) prior to the current firmware version being read (S404). Further, in some embodiments, these operations (S404 and S406) may be completed simultaneously.

With respect to reading the firmware download URL address of a location of the most current available firmware version of APD 310, client device 312 may obtain the URL address from APD 310. In an example embodiment, controller 522 instructs radio 528 to request APD 310 to provide the URL address. Radio 530 of APD 310 receives the request which is provided to controller 514. Controller 514 obtains the URL address of the location of the most current available firmware version of APD 310 as indicated in onboarding program 518 of APD 310. This URL address is the location of the most current available firmware version APD 310.

Returning to FIG. 4, after the firmware download URL address of the APD is read (S406), the contents of the firmware download URL are parsed, and the firmware version number of the most current firmware version, which would be downloaded to the ADP (if required as described in more detail below) will be extracted by the ADP (S408). For example, returning to FIG. 3, after client device 312 obtains the firmware download URL address of APD 310, it will retrieve the contents of the firmware download URL from external network 116.

In some embodiments, APD 310 may retrieve the contents of the firmware download URL from external network 116 by way of cellular network 118. In other embodiments, APD 310 may retrieve may retrieve the contents of the firmware download URL from external network 116 by way of service provider 102, via physical media/wiring 114 and gateway device 108. The content of the firmware download URL are then parsed to determine the most current firmware version number, n, that is available to APD 310.

Returning to FIG. 4, after the contents of the firmware download URL are parsed, and the firmware version is available to APD 310 (S408), the firmware status upgrade will be determined (S410). For example, returning to FIG. 3, client device 312 will determine if the current firmware version number of the firmware on APD 310, m, is the same as the newest firmware version number, n, that is available to APD 310. If m=n, then APD 310 will have the most current firmware version number available already loaded thereon in onboarding program 518. In the case the m=n, APD 310 will not have to download the most current firmware version from the URL, will not have to update onboarding program 518 with the most current firmware version, will not have to reboot and therefore will not have to re-associate to gateway device 108. Therefore, in the case that m=n, APD will relatively quickly show up on the host table of gateway device 108.

On the contrary, if m<n, then APD 310 will not have the most current firmware version that is available already loaded thereon in onboarding program 518. In such a case, APD 310 will therefore ultimately have to download the most current firmware version from the URL, update onboarding program 518 with the most current firmware version, reboot, and re-associate with gateway device 108. Therefore, in the case that m<n, APD will take a relatively long time to show up on the host table of gateway device 108.

Returning to FIG. 4, after the firmware status upgrade will be determined (S410), the device mode of APD 310 is set as extender (S206). After the device mode of APD 310 is set as extender (S206), the router is reconnected to communication network 300 (S208). These operations (S206 and S208) may be performed in the same manner as discussed above with reference to FIG. 2.

Returning to FIG. 4, after the router is reconnected to communication network 300 (S208), client device 312 waits (S412). For example, now that client device 312 has determined the firmware upgrade status (S410), the wait time may potentially change in accordance with aspects of the present disclosure.

As discussed above (S408) the case where the current firmware version number of the firmware on APD 310, m, is less than the newest firmware version number, n, that is available to APD 310 (m<n, such that the upgrade status is FALSE), then APD 310 will not have the most current firmware version number available already loaded thereon in onboarding program 518. In such a case, APD 310 will need to upgrade its firmware, reboot, and re-associate with gateway device 108 before it will show up on the host table of gateway device 108. If APD 310 needs to upgrade its firmware, then client device 312 waits $X_1$ seconds. In a non-limiting example embodiment, $X_1$ is 50, which should provide ample time for APD 310 to upgrade its firmware, reboot and re-associate with gateway device 108.

As discussed above (S408) the case where the current firmware version number of the firmware on APD 310, m, is the same as the newest firmware version number, n, that is available to APD 310 (m=n, such that the upgrade status is TRUE), then APD 310 will have the most current firmware version number available already loaded thereon in onboarding program 518. In such a case, APD 310 does not need to upgrade its firmware, then client device 312 waits $X_2$ seconds. It should be noted that $X_2$ seconds is shorter than $X_1$ seconds. In a non-limiting example embodiments $X_2$ is 10.

After client device 312 waits (S412), client device 312 reads the host table on gateway device 108 (S212). It is then determined whether or not APD 310 is currently active in the router's network (S214). If it is determined that APD 310 is not currently active in the router's network (No at S214), client device 312 checks if the wait period has timed out (S218). If client device 312 determines that the wait period has timed out (Yes at S218), then the onboarding of APD 310 has failed (S220) ending algorithm 400 (S414). If client device 312 determines that the wait period has not timed out (No at S218), then client device 312 once again reads the host table on gateway device 108 (return to S212). If it is determined that APD 310 is currently active in the router's network (Yes at S214), client device 312 determines if APD 310 was active in a previous host table check (S216). If it is determined that APD 310 was not active in a previous host table check (No at S216), then client device 312 once again determines if the wait period has timed out (S218). If it is determined that APD 310 was active in previous hosts table check (Yes at S216), then the onboarding of APD 310 was a success (S222), ending algorithm 400 (S414).

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

Conventionally, when an APD is purchased, it might need to update its software before it joins a gateway device's network. This process causes the APD to reboot. This updating of software and rebooting of the APD increases the time before the APD shows up on the host table of the gateway, onto which the APD is onboarding. A client device that is monitoring this onboarding process will wait a relatively long duration of time before checking the host table of the gateway to determine whether the APD as onboarded correctly to account for the time required for the software update and reboot of the APD. Occasionally, this wait time is meaningless as the APD may already have the most recent version of its software.

In accordance with the present disclosure, a client device determines the current firmware version of an APD. The client device also determines the firmware upgrade URL address of the APD. The client device then will compare the current APD firmware version number of the firmware loaded on the APD with the most recent firmware version number, identified at the URL and that is available to the APD, to determine whether the APD has the most recent firmware version available. In the event that the APD has the most recent firmware version available, then the client device may more quickly read the host table of the gateway device to determine whether the APD has onboarded correctly.

The present disclosure as disclosed optimizes the time taken to complete APD onboarding. The client device does not have to wait aimlessly for APD to appear on the host table of the gateway device. The client device prioritizes the firmware upgrade status of the APD, which potentially leads to the elimination of the wait period.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A client device for use with an access point device, a gateway device, an external network, and an external server, the gateway device configured to provide a wireless local area network, the access point device being configured to onboard onto the gateway device, the external server having stored therein firmware version information indicating a most recent firmware version number, n, associated with the access point device, the access point device having a loaded firmware version number, m, loaded thereon, said client device comprising:
   a radio;
   a memory; and
   a processor configured to execute instructions stored on said memory to cause said client device to:
      connect to the access point device;
      instruct the radio to request, from the access point device, the loaded firmware version number, m, wherein m is a most current firmware version of the access point device;
      receive m from the access point device;
      obtain, from the external server via the external network, a most recent firmware version number, n;
      disconnect from the access point device; and
      wait a predetermined period of time and then connect to the gateway device,
      wherein the predetermined period of time is a first period of time when m=n,
   and
      wherein the predetermined period of time is a second period of time when m<n.

2. The client device of claim 1, wherein said processor is further configured to cause the client device to obtain the most recent firmware version number, n, from a uniform resource locator of the Internet.

3. The client device of claim 2, wherein the uniform resource locator of the Internet is obtained from the access point device.

4. The client device of claim 1, wherein the second predetermined period is longer than the first predetermined period.

5. A method of operating a client device for use with an access point device, a gateway device, an external network, and an external server, the gateway device configured to provide a wireless local area network, the access point device being configured to onboard onto the gateway device, the access point device having unique access point device information stored thereon, the external server having stored therein firmware version information indicating a most recent firmware version number, n, associated with the access point device, the access point device having a loaded firmware version number, m, loaded thereon, said method comprising:
   connecting, via a processor configured to execute instructions stored on a memory and from the access point device, to the access point device;
   instructing, via the processor, a radio of the client device to request the loaded firmware version number, m, wherein m is a most current firmware version of the access point device;
   receive, via the processor, m from the access point device;
   obtaining, via the processor and from the external server via the external network, a most recent firmware version number, n,
   disconnecting, via the processor, from the access point device; and
   waiting, via the processor, a predetermined period of time and then connecting to the gateway device,
   wherein the predetermined period of time is a first predetermined period of time when m=n, and
   wherein the predetermined period of time is a second predetermined period of time when m<n.

6. The method of claim 5, further comprising obtaining, via the processor, the most recent firmware version number, n, from a uniform resource locator of the Internet.

7. The method of claim 6, wherein obtaining the most recent firmware version number, n, from a uniform resource locator of the Internet comprises obtaining the uniform resource locator of the Internet from the access point device.

8. The method of claim 5, wherein the second predetermined period is longer than the first predetermined period.

9. A non-transitory, computer-readable media having computer-readable instructions stored thereon, the computer-readable instructions being capable of being read by a client device for use with an access point device, a gateway device, an external network, and an external server, the gateway device configured to provide a wireless local area network, the access point device being configured to onboard onto the gateway device, the access point device having unique access point device information stored thereon, the external server having stored therein firmware version information indicating a most recent firmware version number, n, associated with the access point device, the access point device having a loaded firmware version number, m, loaded thereon, wherein the computer-readable instructions are capable of instructing the client device to perform the method comprising:
   connecting, via a processor configured to execute instructions stored on a memory and from the access point device, to the access point device;
   instructing, via the processor, a radio of the client device to request the most loaded firmware version number, m, wherein m is a most current firmware version of the access point device;
   receive, via the processor, m from the access point device;
   obtaining, via the processor and from the external server via the external network, a most recent firmware version number, n;
   disconnecting, via the processor, from the access point device; and waiting, via the processor, a first predetermined period of time and then connecting to the gateway device, wherein the predetermined period of time is a first predetermined period of time when m=n, and wherein the predetermined period of time is a first predetermined period of time when m<n.

10. The non-transitory, computer-readable media of claim 9, wherein the computer-readable instructions are capable of instructing the client device to perform the method further comprising obtaining, via the processor, the most recent firmware version number, n, from a uniform resource locator of the Internet.

11. The non-transitory, computer-readable media of claim 10, wherein the computer-readable instructions are capable of instructing the client device to perform the method wherein obtaining the most recent firmware version number, n, from a uniform resource locator of the Internet comprises obtaining the uniform resource locator of the Internet from the access point device.

12. The non-transitory, computer-readable media of claim 9, wherein the computer-readable instructions are capable of instructing the client device to perform the method wherein the second predetermined period is longer than the first predetermined period.

* * * * *